J. E. Wisner,
Horse Rake.

No. 109,700.    Patented Nov. 29, 1870.

Witnesses:
Victor Hagonium
August Bassert

Inventor:
J. E. Wisner
By Farwell, Ellsworth &c.
Attorneys.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 109,700, dated November 29, 1870.

*To all whom it may concern:*

Be it known that I, JAMES E. WISNER, of Friendship, in the county of Allegany and State of New York, have invented certain new and useful Improvements in Horse Hay-Rakes; and I do hereby declare the following to be a full, clear, and exact description of the same, reference being had to the accompanying drawing, forming part of this specification.

Figure 1:
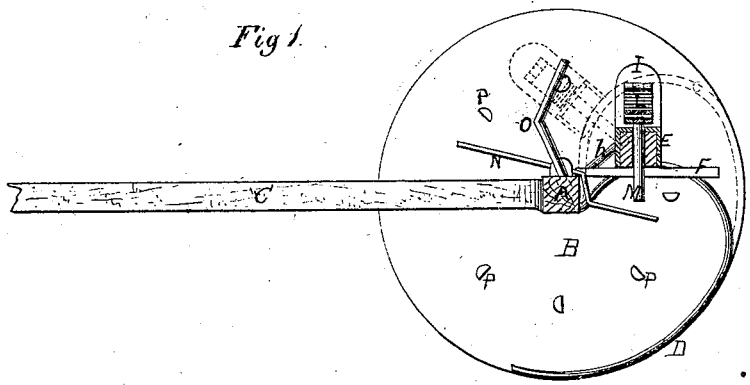
Figure 2:
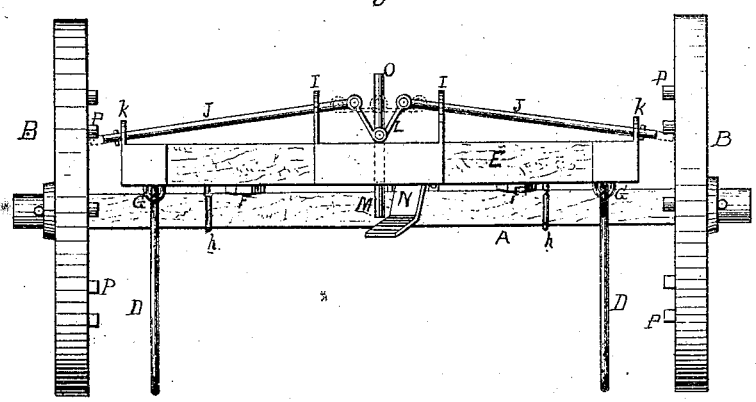
Figures 3, 4:
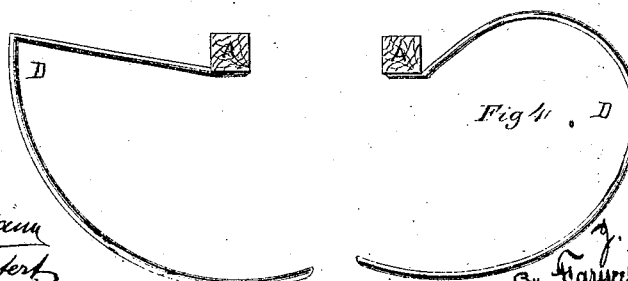

Figure 1 is a transverse section of my improved rake, taken in the plane of the line *x x*, Fig. 2. Fig. 2 is a rear-end elevation of the same. Figs. 3 and 4 are detached views of teeth which I employ in my improved rake.

Similar letters of reference indicate corresponding parts in the several figures of the drawing.

My invention has for its object to facilitate the dumping of horse hay-rakes; and to this end it consists in the combination and various devices to be hereinafter described, whereby the teeth are lifted by the wheels of the rake for the purpose of dumping the hay into a windrow, and automatically released to drop back into the position for raking.

In rakes of this class the labor of dumping is transferred to the team instead of devolving upon the driver, and the latter is therefore relieved from work, which, in the hand-dumping machines, is very arduous, and can only be performed for several consecutive hours by an exceedingly strong man. In this rake the dumping mechanism is thrown into operation by a foot-lever, requiring the exercise of but little strength upon the part of the driver, so that a boy can operate and control the rake with comparative ease.

In the accompanying drawing, A is the axle, B the wheels, and C the draft-pole, of a horse hay-rake of ordinary construction. D are the rake-teeth, hinged or pivoted to the axle at their upper ends, and extending from the under side of the axle to the rear of the same, either in a straight or curved line, as shown in Figs. 3 and 4, at a point in line, or nearly so, with the periphery of the wheels. From this point they extend downward to the ground in curved lines, describing arcs of circles whose radii equal or nearly equal the radius of the wheels. Their ends are carried to a point perpendicular to the axle, or in front of the same.

While I do not here claim the construction of the rake-teeth, I find such form from actual experiment to be the most efficient in use. Instead of scraping along the ground with their ends against the weight of the hay, they are extended forward, so that their sides rest against the ground and their points pass under the hay in a direction parallel, or nearly so, to the line of draft. They are therefore drawn into the hay by the team, in contradistinction to being raised by the same.

E is the pressure or lifting bar of the rake, supported upon the clearers F in rear of the axle, and slightly above the same. It is hinged to the axle at or near each end by means of the loops *h*, and connected to each of the teeth by means of the loops G, projecting from its under side. I I are two uprights, mounted upon the center of the pressure-bar a short distance apart. J J are the lifting-rods, passing through the uprights I, and through small ears *k*, affixed to the ends of the pressure-bar. The inner ends of the lifting-rods between the uprights are pivoted or hinged to a jointed bar, L, which is connected to a pin, M, passing vertically through the center of the pressure-bar. N is a foot-lever, pivoted to the axle in such a manner as to extend beneath the end of the pin N, and O is an upright stop or rod upon the axle beside the foot-lever.

The operation is as follows: When it becomes necessary or desirable to dump the hay into a windrow, the driver presses with his foot upon the lever N and raises the pin M. This pin, in its turn, raises the center of the jointed bar L and throws the lifting-rods outward toward the wheels. As the latter revolve the pins P upon their inner faces engage with the ends of the lifting-rods and carry the same, together with the pressure-bar, upward and over the axle, as shown by dotted lines in Fig. 1. This movement of the pressure-bar raises the teeth sufficiently to clear and dump the hay, and is continued until the jointed bar L comes in contact with the upright stop O, when the pin M is forced back through the pressure-bar, and disengages the lifting-rods from the wheels, to permit the pressure-bar and teeth to fall back to their former position.

If desired, the lifting-rods may be made to engage with the spokes of the wheels, or with tooth rims affixed to said spokes. The latter arrangement is, perhaps, preferable.

Having thus described my invention, what I claim as new is—

1. In combination with the wheels of the rake, the sliding rods J, and lifting-bar E, the jointed bar L and pin M, substantially as described, for the purpose specified.

2. In combination with the wheels, the sliding rods J, jointed bar L, and sliding pin M, substantially as described, for the purpose specified.

3. The foot-lever N and stop O, in combination with the sliding pin M, jointed bar L, sliding rods J, and the wheels of the rake, substantially as described, for the purpose specified.

JAMES E. WISNER.

Witnesses:
N. K. ELLSWORTH,
E. A. ELLSWORTH.